US008340488B2

(12) United States Patent
Molin et al.

(10) Patent No.: US 8,340,488 B2
(45) Date of Patent: Dec. 25, 2012

(54) MULTIMODE OPTICAL FIBER

(75) Inventors: Denis Molin, Draveil (FR); Pierre Sillard, Le Chesnay (FR); Yves Lumineau, Herblay (FR)

(73) Assignee: Draka Comteq, B.V., Amsterdam (NL)

( * ) Notice: Subject to any disclaimer, the term of this patent is extended or adjusted under 35 U.S.C. 154(b) by 288 days.

(21) Appl. No.: 12/884,834

(22) Filed: Sep. 17, 2010

(65) Prior Publication Data

US 2011/0064367 A1    Mar. 17, 2011

Related U.S. Application Data

(60) Provisional application No. 61/243,626, filed on Sep. 18, 2009.

(30) Foreign Application Priority Data

Sep. 17, 2009  (FR) ..................... 09 04447

(51) Int. Cl.
G02B 6/028    (2006.01)
(52) U.S. Cl. ...................................... 385/124
(58) Field of Classification Search ............... 385/124
See application file for complete search history.

(56) References Cited

U.S. PATENT DOCUMENTS

| | | | |
|---|---|---|---|
| 4,111,525 A | 9/1978 | Kaminow et al. |
| 4,184,744 A | 1/1980 | Onoda et al. |
| 4,222,631 A | 9/1980 | Olshansky |
| 4,229,070 A | 10/1980 | Olshansky et al. |
| 4,230,396 A | 10/1980 | Olshansky et al. |
| 4,339,174 A | 7/1982 | Levin |
| 4,406,517 A | 9/1983 | Olshansky |
| 4,465,335 A | 8/1984 | Eppes |
| 4,636,235 A | 1/1987 | Glessner et al. |
| 4,636,236 A | 1/1987 | Glessner et al. |
| 4,653,042 A | 3/1987 | d'Auria et al. |
| 4,715,695 A | 12/1987 | Nishimura et al. |
| 4,723,828 A | 2/1988 | Lowe et al. |
| 4,838,643 A | 6/1989 | Hodges et al. |
| 5,142,603 A | 8/1992 | Forrester |
| 5,194,714 A | 3/1993 | Le Sergent |
| 5,278,687 A | 1/1994 | Jannson et al. |
| 5,381,503 A | 1/1995 | Kanamori et al. |
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,904,218 B2 | 6/2005 | Sun et al. |
| 6,912,347 B2 | 6/2005 | Rossi et al. |
| 6,922,515 B2 | 7/2005 | Nechitailo et al. |

(Continued)

FOREIGN PATENT DOCUMENTS

EP    1164393 A2    12/2001

(Continued)

OTHER PUBLICATIONS

European Search Report in counterpart European Application No. 10176645 dated Jun. 27, 2011, pp. 1-7.
French Search Report in counterpart French Application No. 0904447 dated Mar. 27, 2010, pp. 1-7.
Jacomme, "Modal dispersion in multimode graded-index fibers," Applied Optics USA, vol. 14, No. 11, Nov. 1, 1975, pp. 2578-2584.
Gloge et al., "Multimode Theory of Graded-Core Fibers" Bell system Technical Journal 1973, pp. 1563-1578.
Yabre, "Comprehensive Theory of Dispersion in Graded-Index Optical Fibers," Journal of Lightwave Technology, Feb. 2000, vol. 18, No. 2, pp. 166-177.

(Continued)

Primary Examiner — Sung Pak
(74) Attorney, Agent, or Firm — Summa, Additon & Ashe, P.A.

(57)    ABSTRACT

The present invention embraces a multimode optical fiber that includes a glass-based central core having an alpha-index profile and a glass-based cladding immediately surrounding the optical fiber's central core. Typically, the refractive index difference between the central core's minimum refractive index and the cladding's maximum refractive index is greater than $2 \times 10^{-3}$. The multimode optical fiber exhibits reduced bending losses and reduced coupling losses when connected to a standard graded-index fiber.

27 Claims, 6 Drawing Sheets

U.S. PATENT DOCUMENTS

| | | | |
|---|---|---|---|
| 6,941,049 | B2 | 9/2005 | Risch et al. |
| 7,006,751 | B2 | 2/2006 | Provost et al. |
| 7,043,126 | B2 | 5/2006 | Guan et al. |
| 7,043,128 | B2 | 5/2006 | DiGiovanni et al. |
| 7,045,010 | B2 | 5/2006 | Sturman, Jr. |
| 7,089,765 | B2 | 8/2006 | Schaper et al. |
| 7,162,128 | B2 | 1/2007 | Lovie et al. |
| 7,315,677 | B1 | 1/2008 | Li et al. |
| 7,322,122 | B2 | 1/2008 | Overton et al. |
| 7,346,244 | B2 | 3/2008 | Gowan et al. |
| 7,356,234 | B2 | 4/2008 | de Montmorillon et al. |
| 7,400,835 | B2 | 7/2008 | Sardesai et al. |
| 7,406,235 | B2 | 7/2008 | Guan et al. |
| 7,421,172 | B2 | 9/2008 | Matthijse et al. |
| 7,421,174 | B2 | 9/2008 | Fleming, Jr. et al. |
| 7,483,613 | B2 | 1/2009 | Bigot-Astruc et al. |
| 7,515,795 | B2 | 4/2009 | Overton et al. |
| 7,526,177 | B2 | 4/2009 | Matthijsse et al. |
| 7,539,381 | B2 | 5/2009 | Chen et al. |
| 7,555,186 | B2 | 6/2009 | Flammer et al. |
| 7,567,739 | B2 | 7/2009 | Overton et al. |
| 7,570,852 | B2 | 8/2009 | Nothofer et al. |
| 7,574,095 | B2 | 8/2009 | Lock et al. |
| 7,587,111 | B2 | 9/2009 | de Montmorillon et al. |
| 7,599,589 | B2 | 10/2009 | Overton et al. |
| 7,623,747 | B2 | 11/2009 | de Montmorillon et al. |
| 7,639,915 | B2 | 12/2009 | Parris et al. |
| 7,646,952 | B2 | 1/2010 | Parris |
| 7,646,954 | B2 | 1/2010 | Tatat |
| 7,646,955 | B2 | 1/2010 | Donlagic |
| 7,665,902 | B2 | 2/2010 | Griffioen et al. |
| 7,702,204 | B2 | 4/2010 | Gonnet et al. |
| 7,724,998 | B2 | 5/2010 | Parris et al. |
| 7,783,149 | B2 | 8/2010 | Fini |
| 7,787,731 | B2 | 8/2010 | Bookbinder et al. |
| 7,817,257 | B2 | 10/2010 | Takenaga et al. |
| 7,817,891 | B2 | 10/2010 | Lavenne et al. |
| 7,826,691 | B2 | 11/2010 | Matthijsse et al. |
| 7,865,050 | B1 | 1/2011 | Sun |
| 7,878,712 | B2 | 2/2011 | Shimotakahara et al. |
| 7,903,918 | B1 | 3/2011 | Bickham et al. |
| 8,009,950 | B2 | 8/2011 | Molin et al. |
| 8,184,936 | B2 | 5/2012 | Zhang et al. |
| 2002/0102082 | A1 | 8/2002 | Sarchi et al. |
| 2002/0176678 | A1 | 11/2002 | Mukasa |
| 2002/0197038 | A1 | 12/2002 | Abbott et al. |
| 2003/0024276 | A1 | 2/2003 | Anderson et al. |
| 2004/0247269 | A1 | 12/2004 | Hirano et al. |
| 2005/0008312 | A1 | 1/2005 | Jang et al. |
| 2007/0172182 | A1 | 7/2007 | Lee et al. |
| 2008/0166094 | A1 | 7/2008 | Bookbinder et al. |
| 2008/0292262 | A1 | 11/2008 | Overton et al. |
| 2009/0010596 | A1 | 1/2009 | Matthijsse et al. |
| 2009/0059353 | A1 | 3/2009 | Fini |
| 2009/0092365 | A1 | 4/2009 | Donlagic |
| 2009/0154888 | A1 | 6/2009 | Abbott, III et al. |
| 2009/0169163 | A1 | 7/2009 | Abbott, III et al. |
| 2009/0175583 | A1 | 7/2009 | Overton |
| 2009/0214167 | A1 | 8/2009 | Lookadoo et al. |
| 2009/0252469 | A1 | 10/2009 | Sillard et al. |
| 2009/0279833 | A1 | 11/2009 | Overton et al. |
| 2009/0279835 | A1 | 11/2009 | de Montmorillon et al. |
| 2009/0279836 | A1 | 11/2009 | de Montmorillon et al. |
| 2009/0297107 | A1 | 12/2009 | Tatat |
| 2010/0021170 | A1 | 1/2010 | Lumineau et al. |
| 2010/0028020 | A1 | 2/2010 | Gholami et al. |
| 2010/0040336 | A1 | 2/2010 | Chen et al. |
| 2010/0067855 | A1 | 3/2010 | Barker |
| 2010/0067857 | A1 | 3/2010 | Lovie et al. |
| 2010/0067858 | A1 | 3/2010 | Kim et al. |
| 2010/0092135 | A1 | 4/2010 | Barker et al. |
| 2010/0092138 | A1 | 4/2010 | Overton |
| 2010/0092139 | A1 | 4/2010 | Overton |
| 2010/0092140 | A1 | 4/2010 | Overton |
| 2010/0118388 | A1 | 5/2010 | Pastouret et al. |
| 2010/0119202 | A1 | 5/2010 | Overton |
| 2010/0135623 | A1 | 6/2010 | Overton |
| 2010/0135624 | A1 | 6/2010 | Overton et al. |
| 2010/0135625 | A1 | 6/2010 | Overton |
| 2010/0135627 | A1 | 6/2010 | Pastouret et al. |
| 2010/0142033 | A1 | 6/2010 | Regnier et al. |
| 2010/0142969 | A1 | 6/2010 | Gholami et al. |
| 2010/0150505 | A1 | 6/2010 | Testu et al. |
| 2010/0154479 | A1 | 6/2010 | Milicevic et al. |
| 2010/0166375 | A1 | 7/2010 | Parris |
| 2010/0171945 | A1 | 7/2010 | Gholami et al. |
| 2010/0183821 | A1 | 7/2010 | Hartsuiker et al. |
| 2010/0189397 | A1 | 7/2010 | Richard et al. |
| 2010/0189399 | A1 | 7/2010 | Sillard et al. |
| 2010/0189400 | A1 | 7/2010 | Sillard et al. |
| 2010/0202741 | A1 | 8/2010 | Ryan et al. |
| 2010/0214649 | A1 | 8/2010 | Burov et al. |
| 2010/0215328 | A1 | 8/2010 | Tatat et al. |
| 2010/0220966 | A1 | 9/2010 | Bennett |
| 2010/0254653 | A1 | 10/2010 | Molin et al. |
| 2010/0310218 | A1 | 12/2010 | Molin et al. |
| 2011/0002590 | A1 | 1/2011 | Ooizumi et al. |
| 2011/0026889 | A1 | 2/2011 | Risch et al. |
| 2011/0037183 | A1 | 2/2011 | Tudury et al. |
| 2011/0044594 | A1 | 2/2011 | Tudury et al. |
| 2011/0044595 | A1 | 2/2011 | Sillard et al. |
| 2011/0044596 | A1 | 2/2011 | Zhang et al. |
| 2011/0054861 | A1 | 3/2011 | Lane |
| 2011/0054862 | A1 | 3/2011 | Pimpinella et al. |
| 2011/0058781 | A1 | 3/2011 | Molin et al. |
| 2011/0064367 | A1 | 3/2011 | Molin et al. |
| 2011/0085770 | A1 | 4/2011 | Bigot-Astruc et al. |
| 2011/0123161 | A1 | 5/2011 | Molin et al. |
| 2011/0123162 | A1 | 5/2011 | Molin et al. |
| 2011/0135262 | A1 | 6/2011 | Molin et al. |
| 2011/0135263 | A1 | 6/2011 | Molin et al. |
| 2011/0217012 | A1 | 9/2011 | Bigot-Astruc et al. |

FOREIGN PATENT DOCUMENTS

| | | | |
|---|---|---|---|
| EP | 1727302 | A1 | 11/2006 |
| EP | 1921478 | A1 | 5/2008 |
| EP | 2299303 | A2 | 3/2011 |
| JP | 08-304636 | A | 11/1996 |
| JP | 09-048629 | | 2/1997 |
| JP | 11-064665 | A | 3/1999 |
| JP | 2000-347057 | A2 | 12/2000 |
| JP | 2003-47057 | A2 | 12/2000 |
| JP | 2001-235648 | | 8/2001 |
| JP | 2002-318315 | A | 10/2002 |
| JP | 2006-047719 | A | 2/2006 |
| JP | 2006-078543 | A | 3/2006 |
| JP | 2006-227173 | A | 8/2006 |
| JP | 2007-272239 | | 10/2007 |
| WO | 03/081301 | A1 | 10/2003 |
| WO | 2005/106544 | A1 | 11/2005 |
| WO | 2008/085851 | A1 | 7/2008 |
| WO | 2009/062131 | A1 | 5/2009 |
| WO | 2009/078962 | A1 | 6/2009 |
| WO | 2010/036684 | A2 | 4/2010 |
| WO | 2011/040830 | A1 | 4/2011 |

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

Okamoto et al., "Computer-Aided Synthesis of the Optimum Refractive-Index Profile for a Multimode Fiber," IEEE Transaction on Microwave Theory and Techniques, USA, vol. Mtt-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

European Office Action in counterpart European Application No. 10176645.9 dated Feb. 27, 2012, pp. 1-4.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

Pepeljugoski et al., "15.6-Gbls Transmission Over 1 km of Next Generation Multimode Fiber", IEEE Photonics Technology Letters, vol. 14, No. 5, May 2002, pp. 1-3.

Freund, et al., "High-Speed Transmission in Multimode Fibers", Journal of Lightwave Technology, vol. 28, No. 4, Feb. 15, 2010, pp. 1-18.

MULTIMODE OPTICAL FIBER

CROSS-REFERENCE TO PRIORITY APPLICATIONS

This application claims the benefit of commonly assigned pending French application No. 09/04447 for a "Fiber Optique Multimode" (filed Sep. 17, 2009, at the National Institute of Industrial Property (France)), which is hereby incorporated by reference in its entirety.

This application further claims the benefit of commonly assigned U.S. Patent Application No. 61/243,626 for a "Fiber Optique Multimode" (filed Sep. 18, 2009), which is hereby incorporated by reference in its entirety.

FIELD OF THE INVENTION

The present invention relates to the field of optical fiber transmissions and, more specifically, to a multimode optical fiber having reduced bending losses for use in high-speed applications.

BACKGROUND

An optical fiber conventionally includes an optical core, which transmits and/or amplifies an optical signal, and an optical cladding, which confines the optical signal within the core. Accordingly, the refractive index of the core $n_c$ is typically greater than the refractive index of the outer cladding $n_g$ (i.e., $n_c > n_g$).

The refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding is shown on the y-axis. The refractive index profile is referred to as a "step" profile, a "trapezoidal" profile, an "alpha" profile, or a "triangular" profile for graphs having the respective shapes of a step, a trapezoid, an alpha, or a triangle. These curves are generally representative of the optical fiber's theoretical profile (i.e., the set profile). Constraints in the manufacture of the optical fiber, however, may result in a slightly different actual profile.

Generally speaking, two main categories of optical fibers exist: multimode fibers and single-mode fibers. In a multimode fiber, for a given wavelength, several optical modes are propagated simultaneously along the optical fiber, whereas in a single-mode fiber the higher order modes are strongly attenuated. The typical diameter of a single-mode or multimode optical fiber is 125 microns. The core of a multimode fiber typically has a diameter of between about 50 microns and 62.5 microns, whereas the core of a single-mode fiber typically has a diameter of between about 6 microns and 9 microns. Multimode systems are generally less expensive than single-mode systems because multimode light sources, connectors, and maintenance can be obtained at a lower cost.

In a multimode fiber, the difference between the propagation times, or group delay times, of the several modes along the optical fiber determine the bandwidth of the optical fiber. In particular, for the same propagation medium (i.e., in a step-index-type multimode fiber), the different modes have different group delay times. This difference in group delay times results in a time lag (i.e., a delay) between the pulses propagating along different radial offsets of the optical fiber. This delay causes a broadening of the resulting light pulse. Broadening of the light pulse (i) increases the risk of the pulse being superimposed onto a following pulse and (ii) reduces the bandwidth (i.e., data rate) supported by the optical fiber. The bandwidth, therefore, is directly linked to the group delay time of the optical modes propagating in the multimode core of the optical fiber. Thus, to guarantee a broad bandwidth, it is desirable for the group delay times of all the modes to be identical. Stated differently, the intermodal dispersion should be minimized, or even eliminated, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

An optical fiber having a graded-index profile (i.e., an alpha-index profile) typically has a graded-index core surrounded by a cladding. The alpha-index profile follows a power law for parameter $\alpha$, which can be described by a relationship between the refractive index value n and the distance r from the center of the optical fiber according to the following equation:

$$n(r) = n_{max}\sqrt{1 - 2\Delta\left(\frac{r}{r_1}\right)^\alpha}$$

wherein, $\alpha \geq 1$, and $\alpha$ is a non-dimensional parameter that is indicative of the shape of the refractive index profile;

$n_{max}$ is the maximum refractive index of the multimode optical fiber's core;

$r_1$ is the radius of the multimode optical fiber's core; and $$\Delta = \frac{(n_{max}^2 - n_{min}^2)}{2n_{max}^2}$$

where $n_{min}$ is the minimum refractive index of the multimode core.

A multimode fiber with a graded index (i.e., an alpha profile) therefore has a core profile with a rotational symmetry such that along any radial direction of the optical fiber the value of the refractive index decreases continuously from the center of the optical fiber to its periphery. When a multimode light signal propagates in such a graded-index core, the different optical modes experience differing propagation mediums (i.e., because of the varying refractive indices), which affects the propagation speed of each optical mode differently. Thus, by adjusting the value of the parameter $\alpha$, it is possible to obtain a group delay time that is virtually equal for all of the modes. Stated differently, the refractive index profile can be modified to reduce or even eliminate intermodal dispersion.

As used herein, a "standard graded-index optical fiber" is an optical fiber with an alpha-profile satisfying the ITU-T G.651.1 recommendations and the OM3 standard. Furthermore, a "standard graded-index optical fiber" has a central core with a minimum refractive index approximately equal to the refractive index of the optical fiber's outer optical cladding. For example, the refractive index difference between the central core's minimum refractive index and the outer optical cladding's refractive index is less than $1\times10^{-3}$ (or even zero).

Multimode fibers have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 recommendations are hereby incorporated by reference in their entirety.

In addition, the OM3 standard has been adopted to meet the demands of high-bandwidth applications (i.e., a data rate higher than 1 GbE) over long distances (i.e., distances greater than 300 m). The OM3 standard is hereby incorporated by reference in its entirety. With the development of high-bandwidth applications, the average core diameter for multimode fibers has been reduced from 62.5 microns to 50 microns.

Multimode fibers are commonly used for short-distance applications requiring a broad bandwidth, such as local area networks (LANs), in which the optical fibers may be subjected to accidental or otherwise unintended bending. Bending, however, can modify the mode power distribution and the bandwidth of the fiber.

It is therefore desirable to design multimode fibers that (i) are unaffected by bends having a radius of curvature of less than 10 millimeters, (ii) are compatible with standard graded-index fibers, and (iii) allow high-speed transmission of 10 Gb/s in 10 GbE (Gigabit Ethernet) systems.

One proposed solution to such a problem involves adjusting the light-injection conditions from a light source. Because all of the modes are affected differently by bending, it would be sufficient to modify the light-injection conditions such that the only modes coupled with the injected light are modes unaffected by bends. In practice, however, the light source and the coupling device between the light source and the optical fiber require launch conditions that prevent the adjustment of the injection conditions.

Moreover, restricting the coupling to the lowest order modes reduces the power coupling efficiency. Such a phenomenon can be accompanied by an increase in the impact of the mode partition noise on the light transmitted in the fiber. The increase appears when laser sources are used in combination with the optical fiber and, in particular, if VCSEL (Vertical Cavity Surface Emitting Laser) diodes allowing a transmission of 10 GbE are used. The mode partition noise corresponds to "jitter" of the signal phase due to the combined effects of changing the main mode of the optical source (i.e., "mode hopping") and intramodal distortions in the fiber. The change of the main mode is a sudden jump in the optical frequency of the optical source, associated with transitions between the different modes of the resonator. Thus, changing the main mode of the optical source leads to random modifications in the wavelength which affects the group velocity and therefore the propagation time. Over the length of the fiber, the cumulative effect of this variation of the group velocity is an induced phase jitter (i.e., mode partition noise).

Another known solution proposes applying additional bends to the multimode fiber. For example, European Patent No. 1,727,302 and its counterpart U.S. Patent Publication No. 2009/010596 A1, each of which is hereby incorporated by reference in its entirety, disclose an access network that includes a bent multimode fiber. Bending a multimode fiber in this manner reduces the transmission loss due to a bend in the remaining network. Applying additional bends to a multimode fiber, however, can also reduce power coupling efficiency with an increase in the impact of the mode partition noise if VCSELS allowing a 10-GbE transmission are used.

Another solution is a dedicated fiber architecture (i.e., a specific optical index profile). For example, adding a depressed trench between the core and the cladding can reduce the bending losses of a graded-index multimode fiber. International Publication No. 2008/085851 and its counterpart U.S. Patent Publication No. 2008/0166094 A1, each of which is hereby incorporated by reference in its entirety, describe a graded-index core surrounded by a depressed trench.

Adding a depressed trench between the core and the cladding, however, poses several manufacturing problems. Typically, the central core (i.e., the "alpha" core), the cladding, and at least a portion of the external protective cladding are obtained by chemical vapor deposition (CVD) in a silica tube. The cladding or external protective cladding is constituted by the tube and an overcladding of the tube (e.g., an overcladding of natural or doped silica). The overcladding may be obtained by any other deposition technique (e.g., VAD or OVD). However, the manufacturing methods disclosed in International Publication No. 2008/085851 and U.S. Patent Publication No. 2008/0166094 A1 require a broad deposition zone, which increases the cost of chemical vapor deposition techniques. In fact, this leads to the production of a smaller length of fiber per core rod.

Moreover, the addition of a depressed trench results in the appearance of supplementary propagation modes known as leaky modes. The leaky modes have effective refractive indices that are lower than those of the guided modes. These leaky modes increase the numerical aperture of graded-index optical fibers having a depressed trench in comparison to the graded-index optical fibers without a depressed trench. A difference in numerical aperture can cause losses during connections within a system that employs both (i) depressed trench graded-index fibers and (ii) graded-index fibers without a depressed trench.

Therefore, a need exists for a graded-index optical fiber having reduced bending losses and reduced coupling losses when connected to a standard graded-index fiber.

SUMMARY

Accordingly, in one aspect, the present invention embraces a multimode optical fiber that includes a glass-based central core (i.e., an optical core) having an alpha-index profile (i.e., a graded-index profile) and a radius $r_1$. Typically, the central core's radius $r_1$ is less than about 40 microns (e.g., less than about 35 microns, such as 25 microns). The central core has a maximum refractive index $n_{max}$ and a minimum refractive index $n_{min}$. The optical fiber further includes a glass-based cladding (i.e., a core-contiguous cladding) immediately surrounding the optical fiber's central core and having a radius $r_2$ and a maximum refractive index $n_{cladding}$. Typically, the refractive index difference between the central core's minimum refractive index $n_{min}$, and the cladding's maximum refractive index $n_{cladding}$ is greater than $2\times10^{-3}$ (i.e., $n_{min}-n_{cladding}>2\times10^{-3}$). Typically, the entire core-contiguous cladding has a constant refractive index, namely $n_{cladding}$.

The present multimode optical fiber has outstanding bending-loss performance. In this regard, at a wavelength of 850 nanometers, for two turns around a radius of curvature of 15 millimeters, the optical fiber typically exhibits bending losses of less than about 0.1 dB.

In an exemplary embodiment, the refractive index difference between the central core's maximum refractive index $n_{max}$ and the central core's minimum refractive index $n_{min}$, is at least $10 \times 10^{-3}$ (i.e., $n_{max} - n_{min} > 10 \times 10^{-3}$).

In another exemplary embodiment, the central core's radius $r_1$ is between about 22 microns and 28 microns.

In yet another exemplary embodiment, the parameter α of the central core's alpha refractive index profile is between about 1.9 and 2.2.

In yet another exemplary embodiment, the parameter α of the central core's alpha refractive index profile is between about 2.0 and 2.1.

In yet another exemplary embodiment, the parameter α of the central core's alpha refractive index profile is between about 1.9 and 2.1.

In yet another exemplary embodiment, the cladding immediately surrounding the optical fiber's central core (i.e., the core-contiguous cladding) is an outer optical cladding.

In yet another exemplary embodiment, the multimode optical fiber includes an outer optical cladding surrounding the central core and the core-contiguous cladding.

In yet another exemplary embodiment, the core-contiguous cladding has a rectangular refractive index profile (i.e., a substantially constant refractive index).

In yet another exemplary embodiment, the difference between the core-contiguous cladding's radius $r_2$ and the central core's radius $r_1$ is between about 2 microns and 15 microns.

In yet another exemplary embodiment, the difference between the core-contiguous cladding's radius $r_2$ and the central core's radius $r_1$ is at least about 5 microns (e.g., between 10 microns and 20 microns).

In yet another exemplary embodiment, the optical fiber has a numerical aperture of between about 0.18 and 0.29 as defined by $(n_{max}^2 - n_{min}^2)^{1/2}$.

In yet another exemplary embodiment, the optical fiber has a data rate of at least 10 Gb/s over at least 100 meters (e.g., at least 300 meters).

In another aspect, the present invention embraces an optical transmission system that includes a multimode optical fiber having an alpha-index profile central core and a cladding immediately surrounding the optical fiber's central core.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a multimode optical fiber that achieves reduced bending losses and reduced coupling losses when connected to a standard graded-index fiber.

The multimode optical fiber includes a glass-based, graded-index central core and a glass-based, core-contiguous cladding that immediately surrounds the central core. The central core has a radius $r_1$ of less than about 40 microns and an alpha refractive index profile. The central core has a maximum refractive index $n_{max}$ and, at the central core's radius $r_1$, a minimum refractive index $n_{min}$. The core-contiguous cladding has a radius $r_2$ and a maximum refractive index $n_{cladding}$. Typically, the central core's minimum refractive index $n_{min}$, is at least $2 \times 10^{-3}$ greater than the core-contiguous cladding's maximum refractive index $n_{cladding}$.

In some exemplary embodiments, the multimode optical fiber includes an outer optical cladding that surrounds the central core and the core-contiguous cladding. Typically, the outer optical cladding has a refractive index that is less than the central core's minimum refractive index $n_{min}$. For example, the central core's minimum refractive index $n_{min}$ may exceed the outer optical cladding's refractive index by $2 \times 10^{-3}$ or more.

In other exemplary embodiments, the core-contiguous cladding is the outer optical cladding (i.e., no inner cladding is positioned between the central core and the outer optical cladding).

The core-contiguous cladding may have a maximum refractive index $n_{cladding}$ that is greater than or equal to that of the outer optical cladding. Alternatively, the core-contiguous cladding may have a maximum refractive index $n_{cladding}$ that is less than that of the outer optical cladding.

Figure 1:
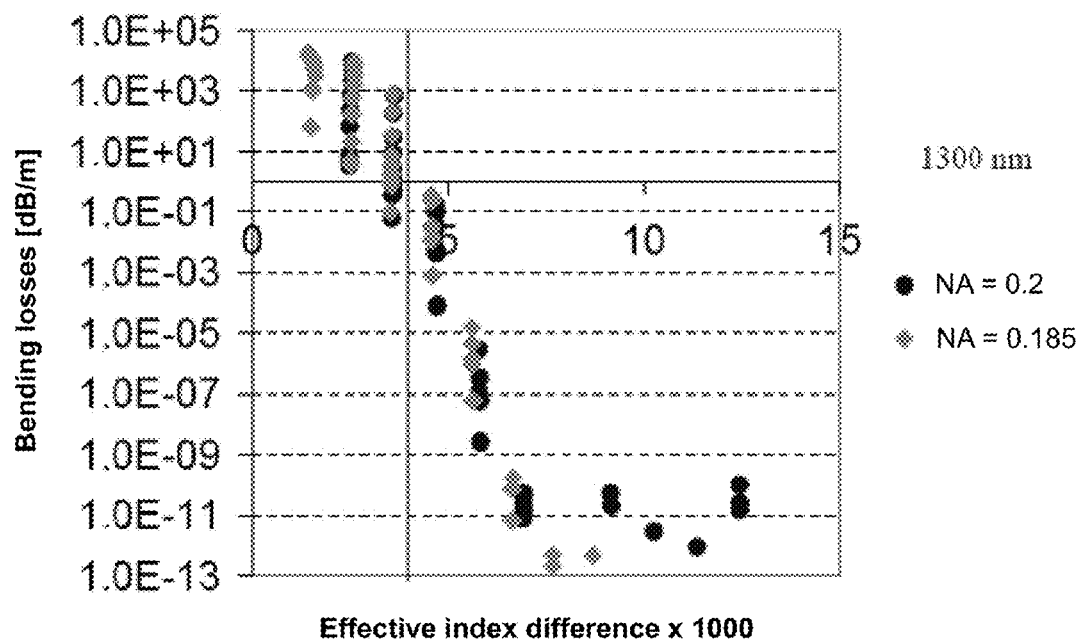
FIG. 1 graphically depicts the bending losses of two optical fibers for two turns around a radius of curvature of 15 millimeters at a wavelength of 1300 nanometers as a function of effective refractive index difference.
Figure 2:
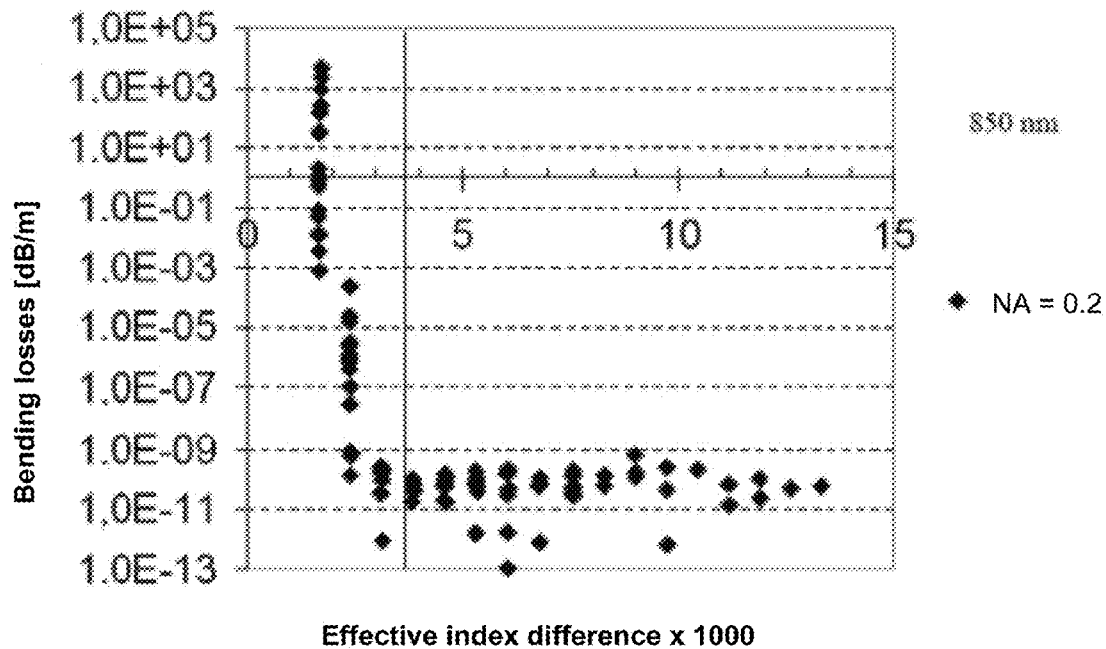
FIG. 2 graphically depicts the bending losses of an optical fiber for two turns around a radius of curvature of 15 millimeters at a wavelength of 850 nanometers as a function of effective refractive index difference.

The bending losses in the modes of a multimode fiber primarily depend on the effective mode index. FIGS. 1 and 2 graphically depict bending losses as a function of the effective refractive index difference of optical fibers for two turns around a radius of curvature of 15 millimeters at wavelengths of 1300 nanometers and 850 nanometers, respectively. The effective refractive index difference is the difference between the effective refractive index of the mode and the refractive index of the cladding.

FIG. 1 contains data from experiments carried out on two fibers having numerical apertures of 0.2 and 0.185. FIG. 2 contains data from experiments carried out on a fiber having a numerical aperture of 0.2. The data of FIGS. 1 and 2 was obtained by bending the optical fibers at a radius of curvature of 15 millimeters. As shown in FIGS. 1 and 2, the modes affected by bends have an effective index difference (i.e., an effective refractive index difference) of $4 \times 10^{-3}$. The extent to which a multimode optical fiber's transmission is affected by bending is therefore directly linked to the ratio of the number of modes unaffected by bends to the total number of modes. Bending losses may be measured in accordance with measurement methods referenced in the ITU-T G.651.1 recommendations (e.g., IEC 60793-1-47, 60793-2-10, and IEC 61280-4-1).

Accordingly, the present invention seeks to increase the effective refractive index of the guided modes that also exist in the standard graded-index multimode fiber. To this end, a specific multimode fiber architecture (i.e., a refractive index profile) is proposed that reduces bending losses for high-speed data transmission (e.g., 10-GbE data transmission).

Figure 3:
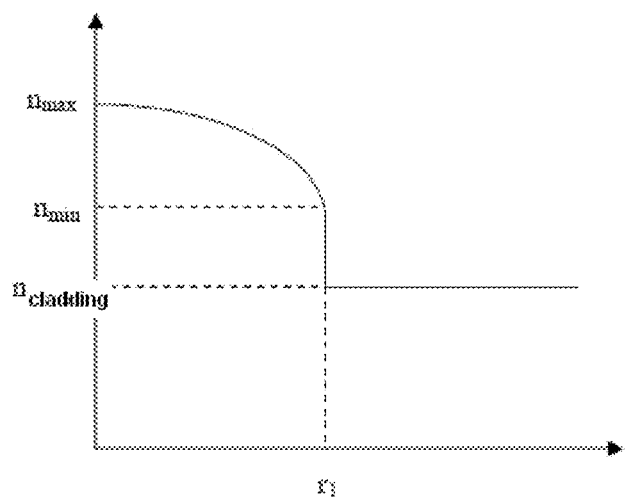
FIG. 3 schematically depicts the refractive index profile of an exemplary optical fiber.

FIG. 3 schematically depicts the refractive index profile of an exemplary glass-based optical fiber. The exemplary optical fiber includes a glass-based, core-contiguous cladding that immediately surrounds a glass-based central core. Typically, the core-contiguous cladding has a substantially constant refractive index over its width (i.e., the core-contiguous cladding has a rectangular or step refractive index profile). It is within the scope of the present invention, however, to employ a core-contiguous cladding that has a non-constant refractive index over its width. The core-contiguous cladding's maximum refractive index is labeled "$n_{cladding}$."

The core-contiguous cladding has a radius $r_2$ (not shown in FIG. 3). Typically, the width of the core-contiguous cladding (i.e., the difference between the core-contiguous cladding's radius $r_2$ and the central core's radius $r_1$) is at least about 2 microns (e.g., between 2 microns and 15 microns). More typically, the width of the core-contiguous cladding is at least about 5 microns.

The depicted optical fiber further includes a glass-based central core with a radius $r_1$ that is immediately surrounded by the core-contiguous cladding (i.e., the cladding is in direct contact with the core). Typically, the optical fiber's central core has a radius $r_1$ equivalent to that of a standard multimode fiber. For example, the central core's radius $r_1$ may be less than about 40 microns (e.g., less than about 36.25 microns). Typically, the central core's radius $r_1$ is between about 22 microns and 28 microns (e.g., about 25 microns).

The central core has an alpha-index profile (i.e., a graded-index profile or alpha optical index profile). The parameter $\alpha$ of the central core's alpha refractive index profile is typically between about 1.9 and 2.2 (e.g., between about 1.9 and 2.1). More typically, the parameter $\alpha$ of the central core's alpha refractive index profile is between about 2.0 and 2.1. As depicted in FIG. 3, the central core has a maximum refractive index $n_{max}$ and a minimum refractive index $n_{min}$. In some embodiments, the refractive index difference between the central core's maximum refractive index $n_{max}$ and the central core's minimum refractive index $n_{min}$ is greater than $10 \times 10^{-3}$ (i.e., $n_{max} - n_{min} > 10 \times 10^{-3}$). In an exemplary embodiment, the refractive index difference between the central core's maximum refractive index $n_{max}$ and the central core's minimum refractive index $n_{min}$ is greater than about $12 \times 10^{-3}$.

The multimode optical fiber of the present invention includes a central core having a minimum refractive index $n_{min}$ that is greater than the refractive index of the cladding that immediately surrounds the central core (i.e., the core-contiguous cladding). Stated differently, the refractive index difference between the central core's minimum refractive index $n_{min}$, and the core-contiguous cladding's maximum refractive index $n_{cladding}$ is positive (i.e., $n_{min} - n_{cladding} > 0$). Moreover, as depicted in FIG. 3, at the value of $r=r_1$, there is a distinct, discontinuous drop in the optical fiber's refractive index from a refractive index value of $n_{min}$ to a refractive index value of $n_{cladding}$. This refractive index drop controls the modal dispersion, which consequently ensures modal bandwidth compatibility with data communication. The interface between the core and the core-contiguous cladding is characterized by this discontinuous drop in the refractive index.

In comparison to a standard graded-index optical fiber, the exemplary optical fiber of FIG. 3 includes a central core having a refractive index profile that is increased with respect to the refractive index of the core-contiguous cladding. This increase with respect to the core-contiguous cladding reduces the bending losses of the optical fiber. Even so, the optical fiber is compatible with standard graded-index fibers. The advantages of the optical fiber according to the example of FIG. 3 are herein explained in greater detail.

Figure 4:
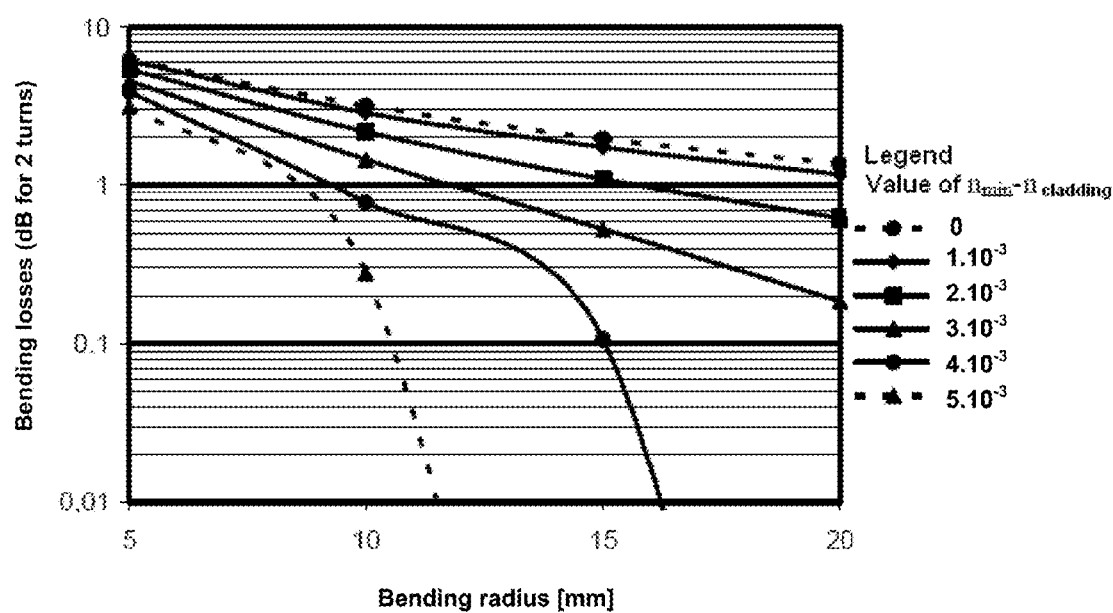
FIG. 4 graphically depicts the bending losses of an optical fiber for two turns at a wavelength of 850 nanometers as a function of the radius of curvature.

FIG. 4 further illustrates the reduced bending losses provided by the optical fiber according to the present invention. The optical fibers plotted in FIG. 4 have the same numerical aperture (i.e., 0.2). FIG. 4 is a graph on a semi-logarithmic scale that shows the development of bending losses for two turns as a function of the radius of curvature of the bend imposed on the optical fiber at a wavelength of 850 nanometers. The development is represented for different values of the difference between the central core's minimum refractive index $n_{min}$ and the core-contiguous cladding's maximum refractive index $n_{cladding}$, namely 0 (i.e., representing a standard graded-index optical fiber), $1 \times 10^{-3}$, $2 \times 10^{-3}$, $3 \times 10^{-3}$, $4 \times 10^{-3}$, and $5 \times 10^{-3}$.

The multimode optical fibers used for the experiment of FIG. 2 have an effective numerical aperture of 0.2. The effective numerical aperture (NA3) of a fiber is defined by the expression:

$$NA3 = (n_{\textit{eff,max}}^2 - n_{\textit{eff,min}}^2)^{1/2}$$

where $n_{\textit{eff,min}}$, and $n_{\textit{eff,max}}$ are the minimum and maximum effective refractive indices of the modes within the signal, respectively, measured at the fiber output under OFL (overfilled launch) conditions (i.e., when the excitation of the signal at the fiber input is uniform over all the propagation modes). This assumes the use of a light source exhibiting uniform excitation over the entire radial surface of the fiber, for example, a laser diode or LED (Light Emitting Diode).

An approximation of the numerical aperture (NA1) may be obtained with the following equation:

$$NA1 = (n_{max}^2 - n_{min}^2)^{1/2}$$

where $n_{max}$ and $n_{min}$, are respectively the maximum and minimum refractive indices of the central core. This particular approximation of the numerical aperture (NA1) is representative of the numerical aperture of a multimode fiber of the present invention when it is excited, under OFL (overfilled launch) conditions, via a standard graded-index optical fiber (e.g., in which the refractive index of the standard outer optical cladding is the same as the minimum refractive index of the standard core). Here, the modes with $n_{\textit{eff}}$ between $n_{cladding}$ and $n_{min}$, are not excited, and so $n_{\textit{eff,min}}$, is well approximated by $n_{min}$.

Another approximation of the numerical aperture (NA2) may be obtained with the following equation:

$$NA2 = (n_{max}^2 - n_{cladding}^2)^{1/2}$$

where $n_{max}$ is the maximum refractive index of the central core and $n_{cladding}$ is the maximum refractive index of the core-contiguous cladding (i.e., the cladding immediately surrounding the optical fiber's central core).

For a standard graded-index optical fiber, the effective numerical aperture of a multimode optical fiber having a 25-micron central core is 0.2, whereas the effective numerical aperture for a multimode fiber having a core of radius 31.25 microns is 0.275.

In the experiment of FIG. 4, all of the guided modes in the optical fiber have an effective index greater than $n_{min}$, and are excited. As herein explained with respect to a system that includes a portion of FIG. 3's exemplary optical fiber, this is possible by coupling FIG. 3's exemplary optical fiber with (i) a standard graded-index multimode fiber under OFL conditions or (ii) a source having a numerical aperture that is less than the effective numerical aperture of FIG. 3's exemplary optical fiber.

At a constant effective numerical aperture, increasing the difference between the central core's minimum refractive index $n_{min}$, and the core-contiguous cladding's maximum refractive index $n_{cladding}$ reduces the optical fiber's bending losses. For example, for a radius of curvature of 10 millimeters, the bending losses for a fiber according to the invention are reduced by approximately 30 percent with respect to a standard graded-index optical fiber.

The exemplary optical fibers of FIG. 4 that have values of $4 \times 10^{-3}$ and $5 \times 10^{-3}$ for the refractive index difference $n_{min}-n_{cladding}$ exhibit bending losses that are reduced by at least 73 percent and 90 percent, respectively, as compared with a standard graded-index optical fiber. The numerical aperture of FIG. 4's exemplary optical fibers is 0.20. As the numerical aperture of an exemplary optical fiber of the present invention is increased, outstanding bending loss performance can be maintained even after reducing the refractive index difference $n_{min}-n_{cladding}$ to $2 \times 10^{-3}$.

Thus, for a given, constant effective numerical aperture, increasing the refractive index difference between the central core's minimum refractive index $n_{min}$ and the core-contiguous cladding's refractive index $n_{cladding}$ (i.e., $n_{min}-n_{cladding}$) reduces the extent to which the fiber is affected by bends. It is advantageous, therefore, for the refractive index difference between the central core's minimum refractive index $n_{min}$ and the core-contiguous cladding's maximum refractive index $n_{cladding}$ to be greater than $2 \times 10^{-3}$. In such a case, the fiber can exhibit bending losses of less than 0.1 dB for two turns for a radius of curvature of 15 millimeters at a wavelength of 850 nanometers.

In some embodiments, the refractive index difference between the central core's minimum refractive index $n_{min}$ and the core-contiguous cladding's maximum refractive index $n_{cladding}$ (i.e., $n_{min}-n_{cladding}$) is between $2 \times 10^{-3}$ and $8 \times 10^{-3}$ (e.g., about $5 \times 10^{-3}$). For example, the central core's minimum refractive index $n_{min}$ may exceed the core-contiguous cladding's maximum refractive index $n_{cladding}$ by between about $3 \times 10^{-3}$ and $7 \times 10^{-3}$ (e.g., between about $4 \times 10^{-3}$ and $6 \times 10^{-3}$). In other embodiments, the refractive index difference between the central core's minimum refractive index $n_{min}$ and the core-contiguous cladding's maximum refractive index $n_{cladding}$ may exceed $8 \times 10^{-3}$.

The multimode optical fiber according to the present invention is intended to be used in an optical transmission system. In this regard, exemplary optical fibers according to the present invention (e.g., the exemplary multimode fiber depicted in FIG. 3) are typically compatible with a standard graded-index optical fiber.

Increasing the refractive index difference between the central core's minimum refractive index $n_{min}$ and the core-contiguous cladding's maximum refractive index $n_{cladding}$ (i.e., $n_{min}-n_{cladding}$), however, typically leads to greater linear losses due to an increase in Rayleigh diffusion and/or absorption. Moreover, the chromatic dispersion of FIG. 3's exemplary optical fiber may be greater than the chromatic dispersion of a standard graded-index optical fiber.

Additionally, the numerical aperture of FIG. 3's exemplary optical fiber may be greater than the maximum permitted by certain industry standards. For example, the numerical aperture (NA1) of FIG. 3's exemplary optical fiber may be greater than 0.18. Typically, the numerical aperture (NA1) is less than about 0.29 (e.g., between about 0.18 and 0.29). As noted, numerical aperture (NA1) is defined by $(n_{max}^2 - n_{min}^2)^{1/2}$.

In some exemplary embodiments, the numerical aperture (NA2) is greater than 0.26 (e.g., between about 0.26 and 0.31). As noted, numerical aperture (NA2) is defined by $(n_{max}^2 - n_{cladding}^2)^{1/2}$.

FIG. 3's exemplary optical fiber, therefore, does not necessarily meet the requirements of the G.651.1 and OM3 standards. In this regard, the refractive index profile of FIG. 3's exemplary optical fiber permits additional modes that do not propagate in a standard graded-index optical fiber. A comparison of FIGS. 5 and 6 illustrates this fact.

Figure 5:
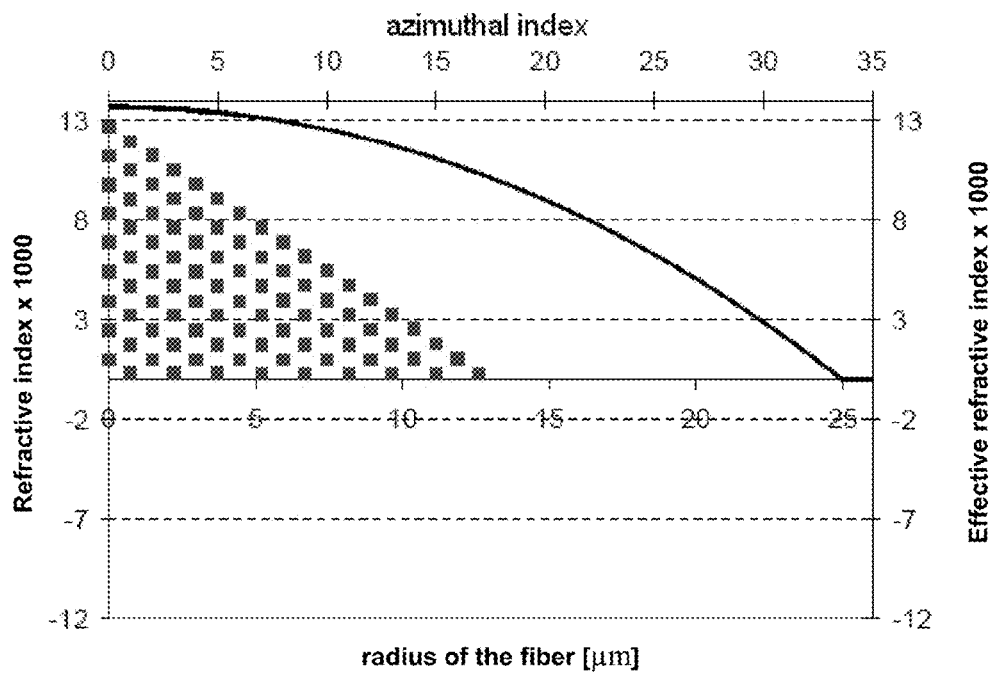
FIG. 5 schematically depicts the refractive index profile of a standard graded-index optical fiber and the modes propagating in the optical fiber.

FIG. 5 schematically depicts the refractive index profile of a standard graded-index optical fiber and the modes propagating in the optical fiber. FIG. 5's optical fiber includes a central core having an alpha-index profile. The lower x-axis shows the radius of the optical fiber, and the y-axis on the left shows the refractive index of the standard graded-index optical fiber. The refractive index profile with respect to the outer optical cladding is represented by a solid black line.

The graph also shows the modes that propagate in the optical fiber as dots on the graph. The y-axis on the right shows the relative effective refractive indices of the propagation modes (i.e., the difference between the effective refractive index of the mode and the refractive index of the outer optical cladding). A reference called the azimuthal index, shown on the upper x-axis, corresponds to each mode. The azimuthal index is also called the main mode number. Typically, the modes are placed in groups of visible modes in a horizontal direction of the graph. For example, the optical fiber shown in FIG. 5 includes 18 mode groups.

Figure 6:
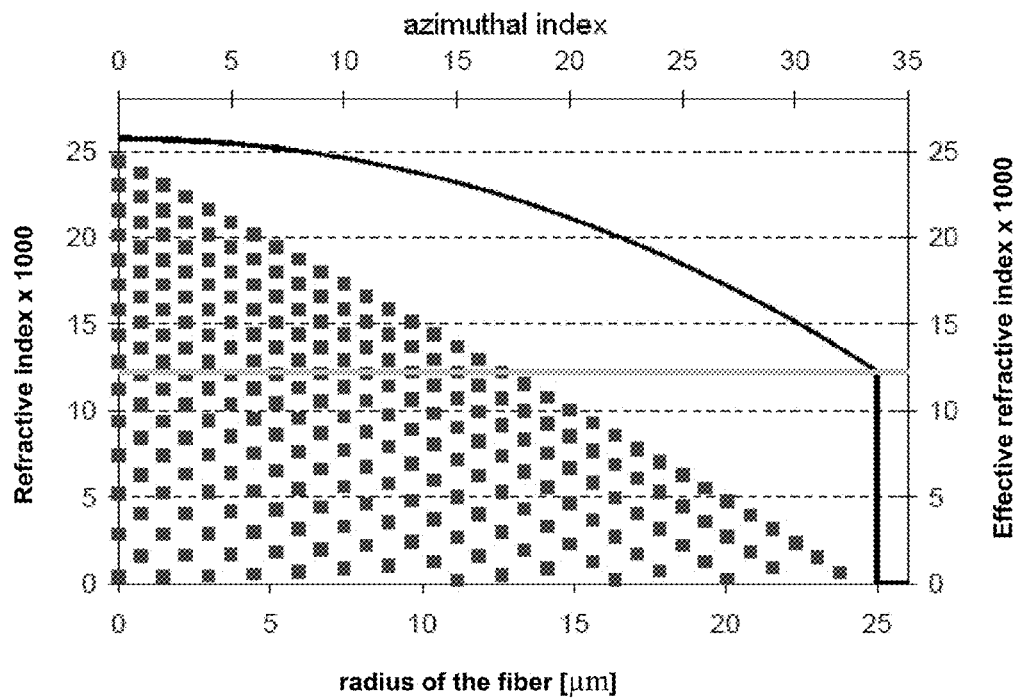
FIG. 6 schematically depicts the refractive index profile of an exemplary graded-index optical fiber and the modes propagating in the fiber.

FIG. 6 schematically depicts the refractive index profile of an exemplary graded-index optical fiber and the modes propagating in the optical fiber. FIG. 6's refractive index profile is a specific embodiment of FIG. 3's more general refractive index profile. The lower x-axis shows the radius of the optical fiber, and the y-axis on the left shows the refractive index of the optical fiber. The central core of FIG. 6's optical fiber has the same alpha-index profile as FIG. 5's standard graded-index optical fiber. The refractive index difference between the central core's minimum refractive index and the core-contiguous cladding's maximum refractive index (i.e., $n_{min}-n_{cladding}$) is $12 \times 10^{-3}$.

The graph also shows the modes that propagate in the optical fiber as dots on the graph. The y-axis on the right shows the relative effective refractive indices of the propagation modes. A reference called the azimuthal index, shown on the upper x-axis, corresponds to each mode. The optical fiber shown has 33 mode groups. The number of modes in FIG. 6's optical fiber, therefore, is greater than the number of modes in a standard graded-index optical fiber.

Among these 33 mode groups, however, only 18 mode groups have an effective index greater than the minimum optical index of the central core. These are the modes situated above the shaded line in FIG. 6. The 18 lower order modes are as numerous as those of the standard graded-index fiber. The 18 modes have a higher effective index than the 18 modes of the corresponding standard graded-index optical fiber, which explains their better resistance to bending losses.

Nevertheless, the 18 modes have the same azimuthal index and, consequently, the same shape. The modes of a standard graded-index fiber, therefore, exist in an optical fiber according to the example of FIG. 6. As a result, when the optical fiber according to the example of FIG. 6 is coupled with a standard graded-index optical fiber, each guided mode of the standard graded-index optical fiber is coupled with only one mode in FIG. 6's exemplary optical fiber (i.e., the mode with the most similar shape). Thus, each mode group of the standard graded-index optical fiber is coupled in only the same mode group in FIG. 6's exemplary optical fiber. The higher order modes in FIG. 6's exemplary optical fiber (which do not exist in the standard graded-index optical fiber) are not excited because they are orthogonal to all of the guided modes of the standard graded-index optical fiber. This becomes apparent, in particular, by analyzing the graphs of FIGS. 7 and 8.

Figure 7:
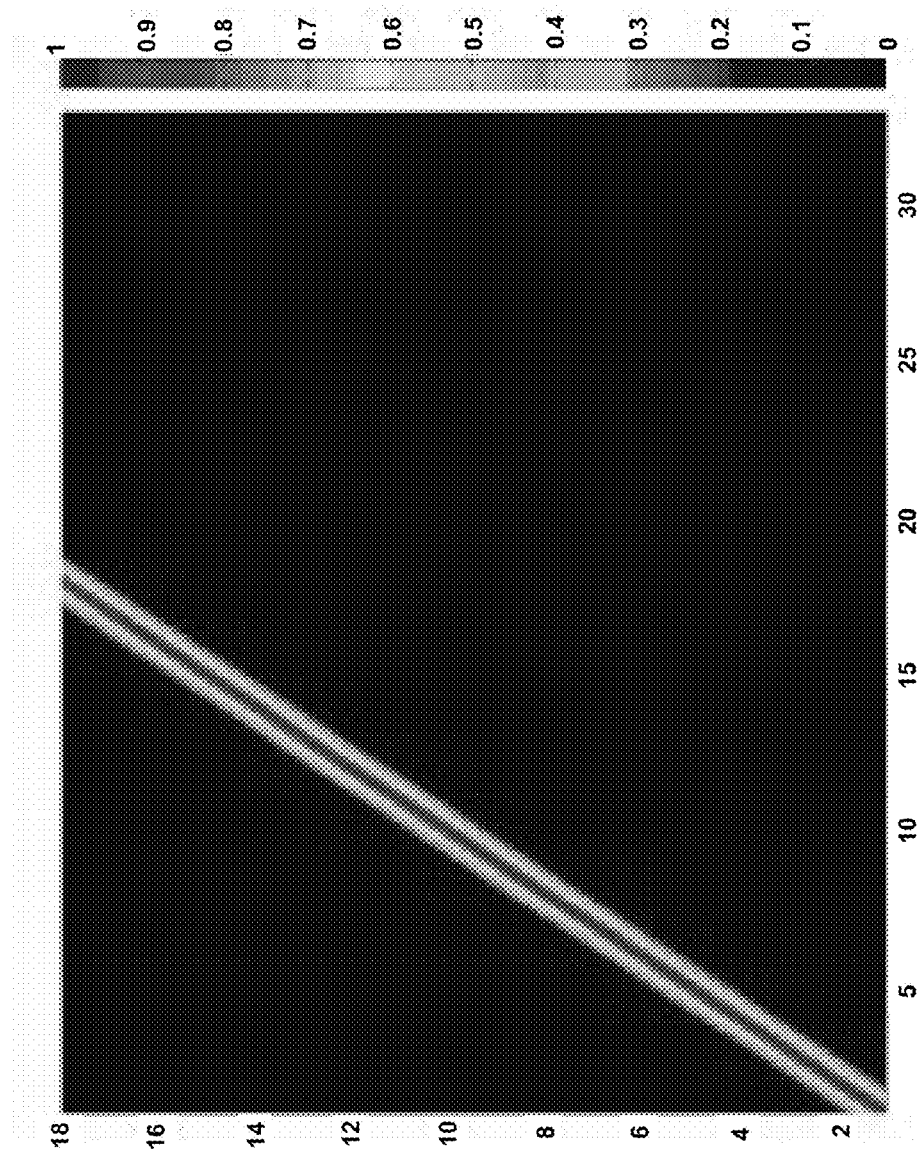
FIG. 7 graphically depicts the coupling efficiency between a standard graded-index optical fiber's mode groups and an exemplary graded-index optical fiber's mode groups when the two fibers are perfectly centered with respect to each other.
Figure 8:
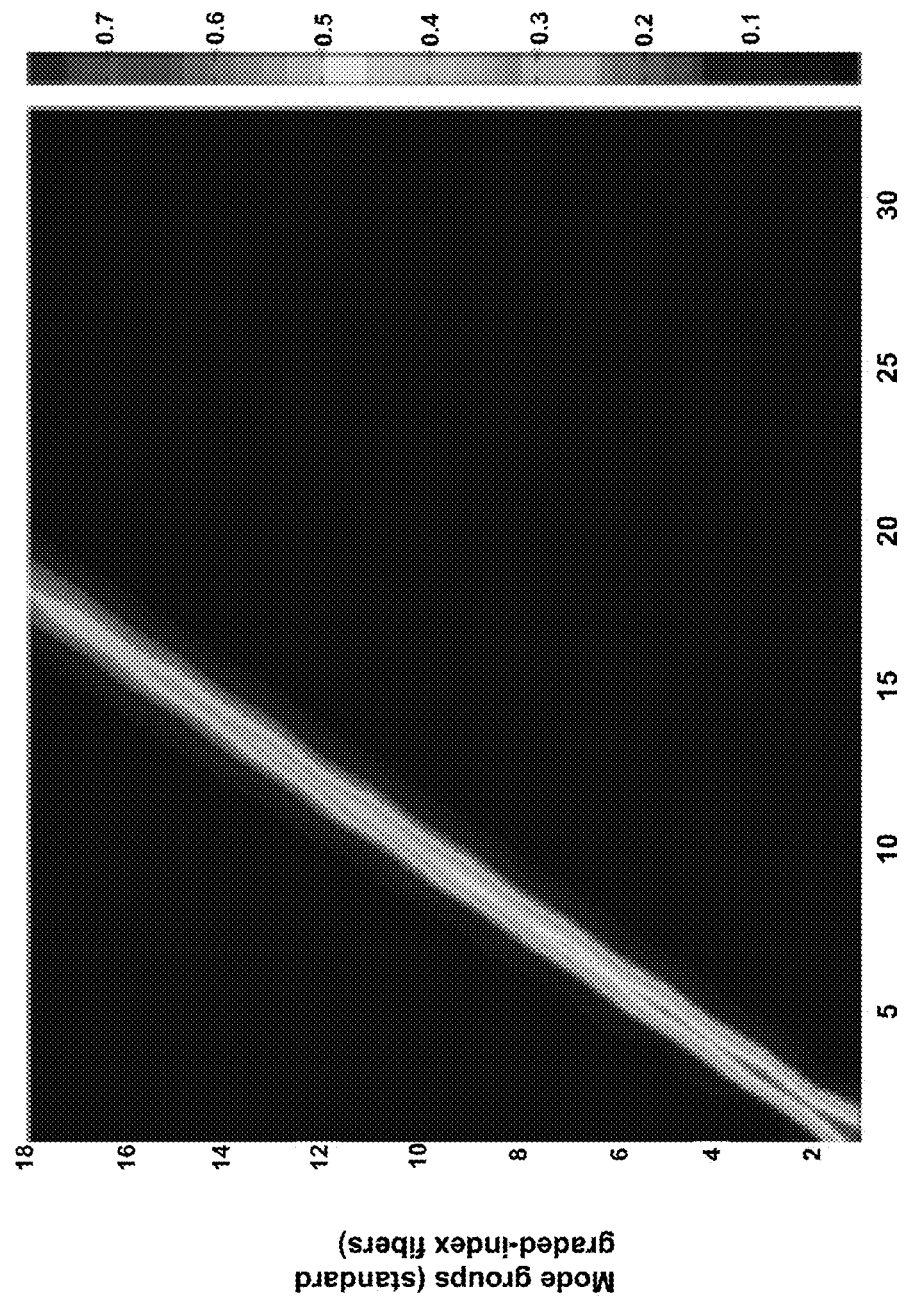
FIG. 8 graphically depicts the coupling efficiency between a standard graded-index fiber's mode groups and an exemplary graded-index optical fiber's mode groups when the two fibers are shifted 3 microns with respect to each other.

FIGS. 7 and 8 graphically illustrate the efficiency of coupling between the 18 mode groups of the standard graded-index optical fiber and the 33 mode groups of the optical fiber according to the example of FIG. 6. The two optical fibers used to generate FIGS. 7 and 8 are the same optical fibers used for FIGS. 5 and 6. A grey scale is used to illustrate the efficiency of coupling. A coupling of 1 corresponds to an ideal coupling without losses between the standard graded-index optical fiber and FIG. 6's exemplary optical fiber. A coupling of 0 corresponds to an absence of coupling.

FIG. 7 is produced under conditions where the two optical fibers are perfectly centered with respect to each other, whereas FIG. 8 is produced under conditions where the optical fibers are shifted 3 microns in relation to each other. As noted previously, a mode group of the standard graded-index optical fiber has the best coupling with the mode group of the exemplary optical fiber having the same main mode number whether in the perfect alignment configuration (FIG. 7) or the shifted configuration (FIG. 8). As a result, the mode groups with a main mode number greater than 18 cannot be excited by a standard graded-index optical fiber. It is thus shown that the standard graded-index optical fiber cannot excite additional modes generated in FIG. 6's exemplary optical fiber by the overall increase in the refractive index of the central core. An optical fiber according to the example of FIG. 6 is therefore compatible with a standard graded-index optical fiber having the same alpha profile.

As previously noted, FIG. 6's refractive index profile is a specific embodiment of FIG. 3's more general refractive index profile. In view of the foregoing, a connection between an optical fiber according to the example of FIG. 3 and a standard graded-index optical fiber does not mix and does not filter propagation modes. An optical fiber according to the example of FIG. 3, therefore, exhibits very good coupling with a standard graded-index optical fiber.

From this observation, it follows that the transmission system can moreover include a light source with a numerical aperture less than the numerical aperture of a standard graded-index optical fiber. If such a source is centered in terms of position and angle, the light originating from the source will be injected into the guided modes, which are compatible with the modes of the standard graded-index optical fiber. The excited modes will have an effective index between the extreme indices of the optical fiber's central core (i.e., $n_{min}$ and $n_{max}$).

When it would be preferable to use a source with a numerical aperture that is less than the numerical aperture of a standard graded-index optical fiber, additional modes are generated. It is then possible to design a specific cable and/or apply additional bends as described in European Patent No. 1,727,302 and its counterpart U.S. Patent Publication No. 2009/010596 A1 in order to eliminate the additional modes created.

Figure 9:
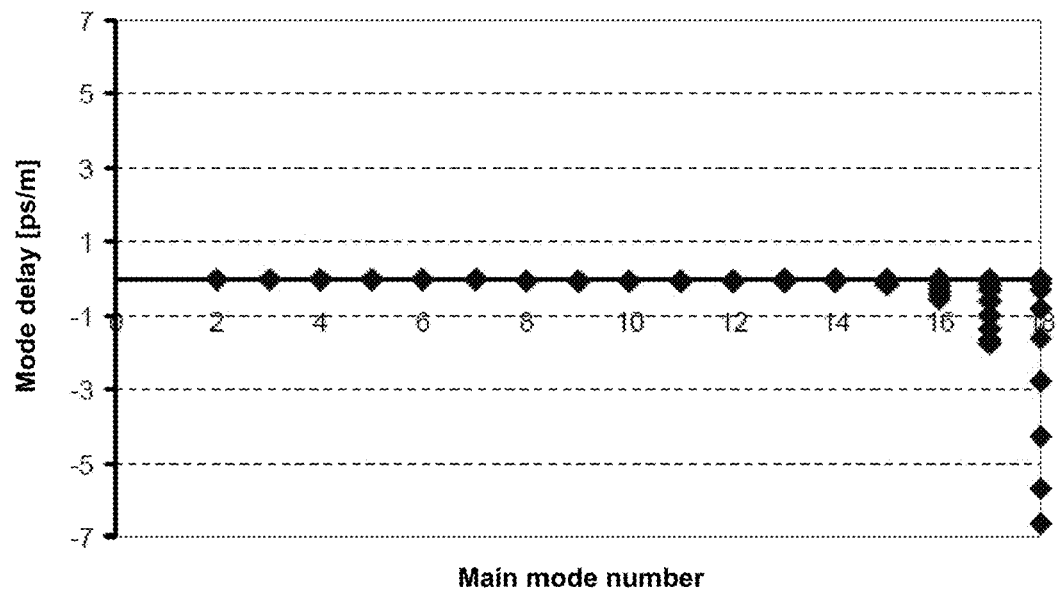
FIG. 9 graphically depicts the propagation delays of the modes as a function of the main mode number for a standard graded-index optical fiber.
Figure 10:
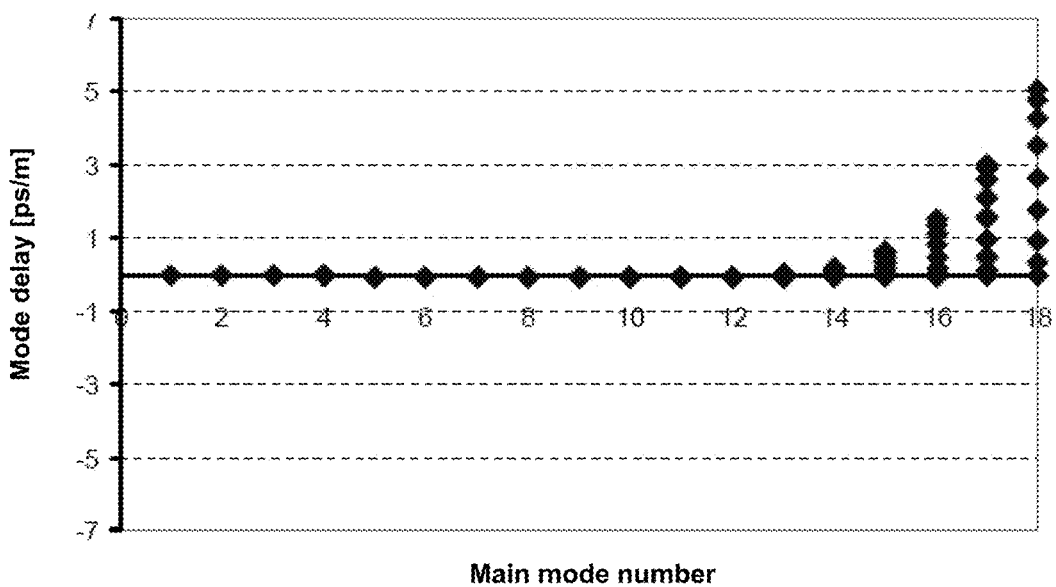
FIG. 10 graphically depicts the propagation delays of the modes as a function of the main mode number for an exemplary multimode graded-index optical fiber according to the invention.

FIGS. 9 and 10 graphically depict the propagation delays of modes as a function of the main mode number for a standard graded-index optical fiber and FIG. 6's exemplary optical fiber, respectively. The modal dispersions observed are similar. Therefore, the optical fibers according to the example of FIG. 3 have the same ability to support transmissions at a greater bit rate than the standard graded-index optical fibers.

The optical fiber according to the example of FIG. 3 is therefore a graded-index optical fiber exhibiting (i) reduced bending losses and (ii) reduced coupling losses to a standard graded-index optical fiber. The maneuverability of the fiber is, in particular, greatly improved thanks to its exceptional insensitivity to bending losses.

FIG. 3's exemplary optical fiber is also compatible with high-speed transmission, therefore, it possible to obtain error-free transmissions for a data rate greater than or equal to 10 Gb/s (10 GbE) for at least about 100 meters (e.g., at least about 300 meters).

The optical fibers according to the present invention may be manufactured, for example, by drawing from final preforms.

A final preform may be manufactured by providing a primary preform with an outer overcladding layer (i.e., an overcladding process). The outer overcladding layer consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

In an exemplary embodiment, the primary preforms are manufactured using a PCVD process, which allows the shape of the central core's gradient refractive index profile to be controlled very precisely.

The depressed trench may be deposited on the inner surface of a substrate tube as part of the chemical vapor deposition process. More typically, the depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD).

In yet another exemplary embodiment, a primary preform is manufactured via an inside deposition process using a fluorine-doped substrate tube. The resulting tube containing the deposited layers may be sleeved by one or more additional fluorine-doped silica tubes so as to increase the thickness of the depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present invention is not limited to the exemplary embodiments described herein. The present optical fiber has good compatibility with other optical fibers and can be installed in numerous transmission systems. The multimode fiber according to the invention can be used in an Ethernet optical system with an improved bandwidth. The fiber can also be used in a local area network (LAN).

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into sub-units (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylori. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for a Optical Fiber Amplifier Having Nanostructures, filed Feb. 19, 2010, (Burow et al.); U.S. patent application Ser. No. 12/765,182 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); and U.S. patent application Ser. No. 12/878,449 for a Multimode Optical Fiber Having Improved Bending Losses, filed Sep. 9, 2010, (Molin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); and U.S. patent application Ser. No. 12/843,116 for a Tight-Buffered Optical Fiber Unit Having Improved Accessibility, filed Jul. 26, 2010, (Risch et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
   a glass-based, graded-index central core having a radius $r_1$ of less than about 40 microns and an alpha refractive index profile, said central core having a maximum refractive index $n_{max}$ and, at said central core's radius $r_1$, a minimum refractive index $n_{min}$; and
   a glass-based, core-contiguous cladding immediately surrounding said central core, said core-contiguous cladding having a radius $r_2$ and a maximum refractive index $n_{cladding}$;
   wherein, at said central core's radius $r_1$, the central core's minimum refractive index $n_{min}$ is at least $2 \times 10^{-3}$ greater than the core-contiguous cladding's maximum refractive index $n_{cladding}$; and
   wherein, for two turns around a radius of curvature of 15 millimeters at a wavelength of 850 nanometers, the optical fiber exhibits a bending loss of less than 0.1 dB.

2. The optical fiber according to claim 1, wherein $n_{max} - n_{min} > 10 \times 10^{-3}$.

3. The optical fiber according to claim 1, wherein, at said central core's radius $r_1$, the central core's minimum refractive index $n_{min}$ exceeds the core-contiguous cladding's maximum refractive index $n_{cladding}$ by more than $8 \times 10^{-3}$.

4. The optical fiber according to claim 1, wherein said central core's radius $r_1$ is between about 22 microns and 28 microns.

5. The optical fiber according to claim 1, wherein the parameter α of said central core's alpha refractive index profile is between about 1.9 and 2.2.

6. The optical fiber according to claim 1, wherein the parameter α of said central core's alpha refractive index profile is between about 2.0 and 2.1.

7. The optical fiber according to claim 1, wherein said core-contiguous cladding is an outer optical cladding.

8. The optical fiber according to claim 1, comprising an outer optical cladding surrounding said central core and said core-contiguous cladding.

9. The optical fiber according to claim 8, wherein the core-contiguous cladding has a rectangular refractive index profile.

10. The optical fiber according to claim 8, wherein the difference between the core-contiguous cladding's radius $r_2$ and the central core's radius $r_1$ is between 2 microns and 15 microns.

11. The optical fiber according to claim 8, wherein the difference between the core-contiguous cladding's radius $r_2$ and the central core's radius $r_1$ is at least about 5 microns.

12. The optical fiber according to claim 1, wherein the optical fiber has a numerical aperture of between about 0.18 and 0.29 as defined by the following relationship:

$$NA1 = (n_{max}^2 - n_{min}^2)^{1/2}.$$

13. The optical fiber according to claim 1, wherein the optical fiber has a numerical aperture of greater than 0.26 as defined by the following relationship:

$$NA2=(n_{max}^2-n_{cladding}^2)^{1/2}.$$

14. The optical fiber according to claim 1, wherein the optical fiber has a data rate of at least 10 Gb/s over at least 100 meters.

15. A cable containing one or more optical fibers according to claim 1.

16. An optical transmission system comprising at least a portion of the optical fiber according to claim 1.

17. A multimode optical fiber, comprising:
  a glass-based, graded-index central core having a radius $r_1$ of less than 35 microns; and
  a glass-based outer optical cladding immediately surrounding said central core, said outer optical cladding having a substantially constant refractive index $n_{cladding}$;
  wherein said central core has an alpha refractive index profile, said central core having a maximum refractive index $n_{max}$ and, at said central core's radius $r_1$, a minimum refractive index $n_{min}$;
  wherein $n_{min}-n_{cladding}>2\times10^{-3}$; and
  wherein, for two turns around a radius of curvature of 15 millimeters at a wavelength of 850 nanometers, the optical fiber exhibits a bending loss of less than 0.1 dB.

18. The optical fiber according to claim 17, wherein $n_{max}-n_{min}>10\times10^{-3}$.

19. The optical fiber according to claim 17, wherein the parameter α of said central core's alpha refractive index profile is between about 1.9 and 2.2.

20. The optical fiber according to claim 17, wherein the optical fiber has a numerical aperture of between about 0.18 and 0.29 as defined by the following relationship:

$$NA1=(n_{max}^2-n_{min}^2)^{1/2}.$$

21. The optical fiber according to claim 17, wherein the optical fiber has a numerical aperture of greater than 0.26 as defined by the following relationship:

$$NA2=(n_{max}^2-n_{cladding}^2)^{1/2}.$$

22. A multimode optical fiber, comprising:
  a glass-based, graded-index central core having a radius $r_1$ of less than 35 microns;
  a glass-based inner cladding immediately surrounding said central core, said inner cladding having a radius $r_2$ and a substantially constant refractive index $n_{cladding}$; and
  a glass-based outer optical cladding surrounding said central core and said inner cladding;
  wherein said central core has an alpha refractive index profile, said central core having a maximum refractive index $n_{max}$ and, at said central core's radius $r_1$ a minimum refractive index $n_{min}$;
  wherein $n_{min}-n_{cladding}>2\times10^{-3}$; and
  wherein, for two turns around a radius of curvature of 15 millimeters at a wavelength of 850 nanometers, the optical fiber exhibits a bending loss of less than 0.1 dB.

23. The optical fiber according to claim 22, wherein $n_{max}-n_{min}>10\times10^{-3}$.

24. The optical fiber according to claim 22, wherein the parameter α of said central core's alpha refractive index profile is between about 1.9 and 2.2.

25. The optical fiber according to claim 22, wherein the difference between the inner cladding's radius $r_2$ and the central core's radius $r_1$ is at least about 2 microns.

26. The optical fiber according to claim 22, wherein the optical fiber has a numerical aperture of between about 0.18 and 0.29 as defined by the following relationship:

$$NA1=(n_{max}^2-n_{min}^2)^{1/2}.$$

27. The optical fiber according to claim 22, wherein the optical fiber has a numerical aperture of greater than 0.26 as defined by the following relationship:

$$NA2=(n_{max}^2-n_{cladding}^2)^{1/2}.$$

* * * * *